United States Patent
Hayashi

(10) Patent No.: US 9,204,284 B2
(45) Date of Patent: Dec. 1, 2015

(54) IN-VEHICLE INFORMATION PROCESSING APPARATUS AND IN-VEHICLE INFORMATION PROCESSING METHOD

(75) Inventor: Kazushige Hayashi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/413,469

(22) PCT Filed: Jul. 10, 2012

(86) PCT No.: PCT/JP2012/067617
§ 371 (c)(1),
(2), (4) Date: Jan. 8, 2015

(87) PCT Pub. No.: WO2014/010031
PCT Pub. Date: Jan. 16, 2014

(65) Prior Publication Data
US 2015/0163660 A1 Jun. 11, 2015

(51) Int. Cl.
| | |
|---|---|
| *H04W 8/18* | (2009.01) |
| *H04W 4/04* | (2009.01) |
| *H04M 1/725* | (2006.01) |
| *H04M 3/22* | (2006.01) |
| *H04W 4/00* | (2009.01) |
| *H04W 4/12* | (2009.01) |

(52) U.S. Cl.
CPC .............. *H04W 8/18* (2013.01); *H04M 1/7253* (2013.01); *H04M 3/2218* (2013.01); *H04W 4/003* (2013.01); *H04W 4/008* (2013.01); *H04W 4/046* (2013.01); *H04W 4/12* (2013.01)

(58) Field of Classification Search
CPC ..... H04W 8/18; H04W 4/12; H04M 2250/10; H04M 2250/02; H04M 3/2218; B60R 2325/205
See application file for complete search history.

(56) References Cited

U.S. PATENT DOCUMENTS

2009/0271110 A1* 10/2009 Sugiura ................ G01C 21/005
                                                              701/532

FOREIGN PATENT DOCUMENTS

| JP | 2002-300640 | 10/2002 |
|---|---|---|
| JP | 2009-264951 | 11/2009 |

OTHER PUBLICATIONS

International Search Report issued Oct. 16, 2012, in PCT/JP12/067617 filed Jul. 10, 2012.

* cited by examiner

*Primary Examiner* — Curtis Odom
(74) *Attorney, Agent, or Firm* — Oblon, McClelland, Maier & Neustadt, L.L.P.

(57) ABSTRACT

An in-vehicle information processing apparatus includes a first obtainment unit to obtain history information including time information on a mobile terminal from the terminal being connected with a vehicle that has the apparatus installed; a second obtainment unit to obtain reference time information; a calculation unit to calculate a time lag, in a state where the vehicle and the terminal are connected with each other for communication, after the terminal has established wireless communication with an external counterpart, between a first time included in the history information obtained when the wireless communication is executed, and a second time when the wireless communication is executed with reference to a reference time obtained by the second obtainment unit; and a correction unit to correct the history information obtained based on the time lag between the first and second times calculated by the calculation unit, when handling the time information on the vehicle.

8 Claims, 2 Drawing Sheets

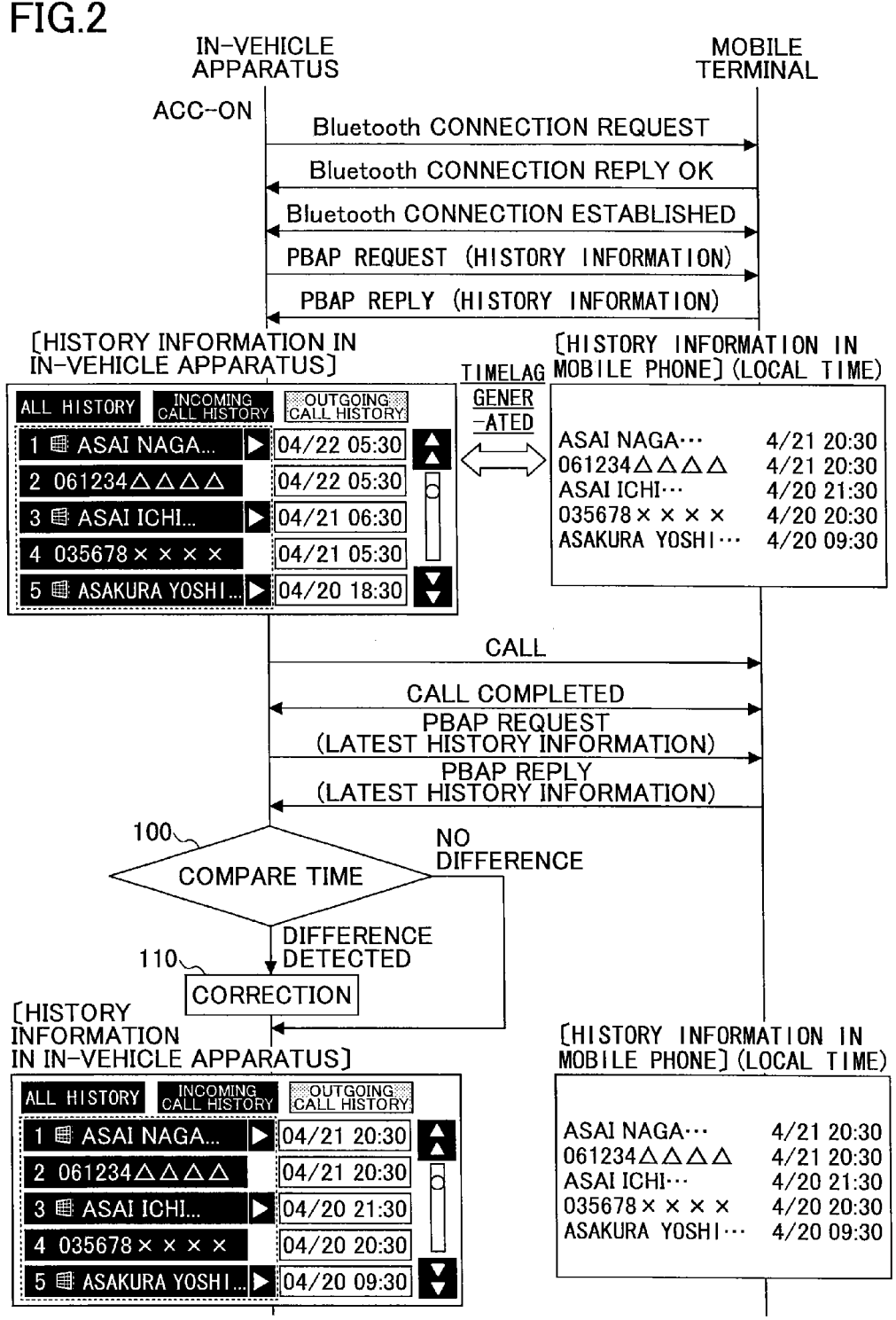

IN-VEHICLE INFORMATION PROCESSING APPARATUS AND IN-VEHICLE INFORMATION PROCESSING METHOD

TECHNICAL FIELD

The present invention relates to an in-vehicle information processing apparatus and an in-vehicle information processing method, especially, an in-vehicle information processing apparatus and an in-vehicle information processing method that are suitable for appropriately handling history information including time information on a mobile terminal on a vehicle.

BACKGROUND ART

Conventionally, an in-vehicle information processing apparatus has been known that corrects time information on a vehicle (for example, see Patent Document 1). This in-vehicle information processing apparatus obtains time information included in a GPS signal transmitted from a GPS satellite, and provides the obtained time information for a vehicle passenger, for example, when displaying a map. Also, this in-vehicle information processing apparatus obtains reference time information that has been obtained by a mobile terminal periodically communicating with a nearby external base station, and corrects the time information included in the GPS signal based on the reference time information. Therefore, according to the above in-vehicle information processing apparatus, it is possible to provide correct local time information at a specific region or a place as time information for a vehicle passenger on the vehicle.

RELATED-ART DOCUMENTS

Patent Documents

[Patent Document 1] Japanese Laid-open Patent Publication No. 2002-300640

SUMMARY OF THE INVENTION

Problem to be Solved by Invention

However, if it is assumed that time information transmitted from a mobile terminal is always correct to be used on a vehicle as in a device disclosed in Patent Document 1, wrong time information may be provided for a passenger on the vehicle, for example, when displaying the time.

Specifically, when a mobile terminal transmits or receives a phone call or an e-mail with an external base station by a wireless communication connection, the mobile terminal stores history information including the time information of the exchange in its memory, and in general, provides the history information stored in the memory to the vehicle by a request from the vehicle for the passenger. Incidentally, models of mobile terminals coexist in terms of time information included in the history information; there are models using Coordinated Universal Time (UTC) (or Greenwich Mean Time (GMT)) based on an atomic clock, and models using local time. Therefore, if the vehicle assumes that history information obtained from mobile terminals is always based on UTC (or GMT), or always based on local time, and the vehicle inflexibly corrects the time information included in the history information obtained from the mobile terminals, or uses the time information as it is without correcting it; then, the history information of the mobile terminals used in the vehicle may not correspond to correct local time information in a country, a region, or a place indicated by some of the history information.

In view of the above, the present invention has an object to provide an in-vehicle information processing apparatus and an in-vehicle information processing method that can improve accuracy of time information when providing the history information of a mobile terminal for a passenger on a vehicle.

Means to Solve the Problem

According to at least one embodiment of the present invention, an in-vehicle information processing apparatus includes a first information obtainment unit configured to obtain history information including time information on a mobile terminal from the mobile terminal being connected with a vehicle for communication, the vehicle having the in-vehicle information processing apparatus installed; a second information obtainment unit configured to obtain reference time information; a calculation unit configured to calculate a time lag, in a state where the vehicle and the mobile terminal are connected with each other for communication, after the mobile terminal has established wireless communication with an external counterpart, between a first time included in the history information whose information is obtained by the first information obtainment unit obtained when the wireless communication is executed, and a second time when the wireless communication is executed with reference to a reference time whose information is obtained by the second information obtainment unit; and a correction unit configured to correct the history information whose information is obtained by the first information obtainment unit based on the time lag between the first time and the second time calculated by the calculation unit, when handling the time information on the vehicle.

Also, according to at least one embodiment of the present invention, an in-vehicle information processing method includes obtaining history information including time information on a mobile terminal from the mobile terminal being connected with a vehicle for communication, the vehicle having the in-vehicle information processing apparatus installed; obtaining reference time information; calculating a time lag, in a state where the vehicle and the mobile terminal are connected with each other for communication, after the mobile terminal has established wireless communication with an external counterpart, between a first time included in the history information whose information is obtained by the obtaining the history information obtained when the wireless communication is executed, and a second time when the wireless communication is executed with reference to a reference time whose information is obtained by the obtaining the reference time information; and correcting the history information whose information is obtained by the obtaining the history information based on the time lag between the first time and the second time calculated by the calculating, when handling the time information on the vehicle.

Advantage of the Invention

According to at least one embodiment of the present invention, it is possible to improve accuracy of time information when providing the history information of a mobile terminal for a passenger on a vehicle.

BRIEF DESCRIPTION OF DRAWINGS

FIG. 2 is a flowchart of an example of a routine executed by an in-vehicle information processing apparatus and a mobile terminal in an information service system in the present embodiment.

MODE FOR CARRYING OUT THE INVENTION

Figure 1:
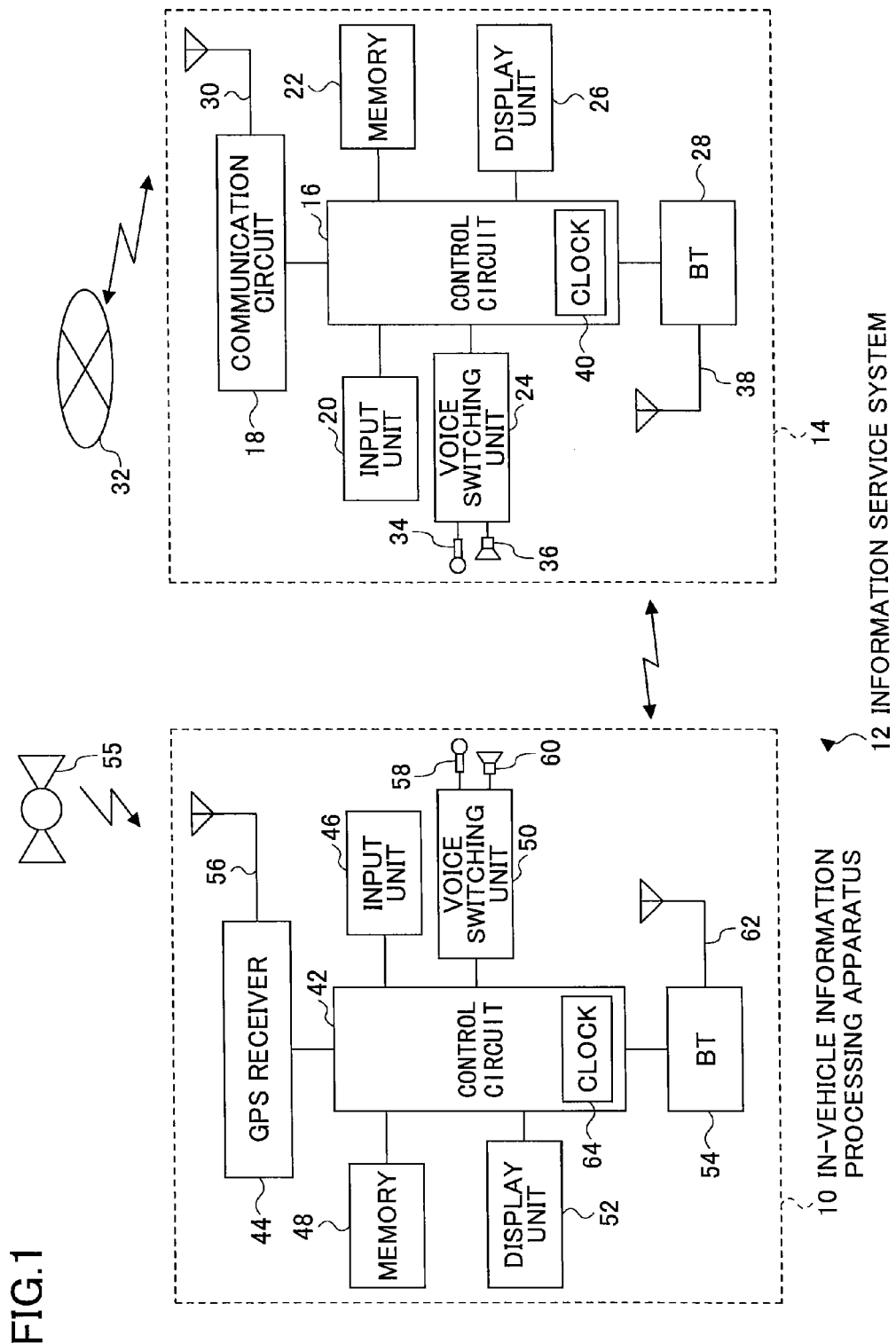
FIG. 1 is a configuration diagram of an information service system including an in-vehicle information processing apparatus according to an embodiment of the present invention.

In the following, specific embodiments of an in-vehicle information processing apparatus and an in-vehicle information processing method will be described according to the present invention.

FIG. 1 illustrates a configuration diagram of an information service system 12 including an in-vehicle information processing apparatus 10 according to an embodiment of the present invention. As shown in FIG. 1, the information service system 12 includes the in-vehicle information processing apparatus 10 such as a navigation device that is built in a vehicle, and a mobile terminal 14 such as a cellular phone, a PDA, or a smart phone that is carried around by a vehicle user. The information service system 12 in the present embodiment is a system that provides history information including time information stored in the mobile terminal 14 for a vehicle passenger by displaying it on the in-vehicle information processing apparatus 10.

The mobile terminal 14 includes a control circuit 16 mainly configured with a microcomputer. The control circuit 16 includes a communication function to execute communication control. To implement a communication function mainly for telephone and e-mail, the control circuit 16 is connected with a communication circuit 18, an input unit 20, a memory 22, a voice switching unit 24, and a display unit 26. To implement near field communication within a range of several meters between the in-vehicle information processing apparatus 10 and the mobile terminal 14, a Bluetooth (trademark) interface (BT) 28 is also connected.

The communication circuit 18 is provided for the mobile terminal 14 to execute wireless communication via a communication antenna 30, with a base station connected in a wireless communication network 32, based on a predetermined communication protocol. The input unit 20 is constituted with multiple keys, which is a part used when a holder of the mobile terminal 14 performs various input operations such as dial input. Also, the memory 22 stores an operation program to implement various functions including the communication function. The memory 22 can also store various data such as partner telephone numbers, outgoing call time, incoming call time, and phone call time as outgoing/incoming call history information of phone calls.

The voice switching unit 24 is connected with a microphone 34 and a loudspeaker 36. The voice switching unit 24 converts a voice signal input from the outside with the microphone 34 into audio data that can be transmitted to the wireless communication network 32 from the communication circuit 18 by wireless transmission, and converts audio data received at the communication circuit 18 from the wireless communication network 32 into a voice signal that can be output from the loudspeaker 36. The display unit 26 is a display device including an LCD that is visible for a holder of the mobile terminal 14, on which various displaying can be executed. Also, the BT 28 is a communication device to execute a communication process based on Bluetooth communication standards for executing near field communication, which make it possible to establish a wireless communication connection with a terminal having a BT existing within a predetermined communication area, using an antenna 38.

Also, the control circuit 16 includes a clock function 40 to clock the time. The control circuit 16 can obtain time information transmitted from a base station in the wireless communication network 32 via a communication circuit. This time information is local time information that represents time in a country or a region where the transmitting base station is located. Based on the obtained local time information, the clock function 40 clocks the local time in a country or a region where the mobile terminal 14 is used, or further clocks Coordinated Universal Time UTC (or Greenwich Mean Time GMT) along with the local time. The time information obtained by the clock function 40 can be output via the display unit 26, and can be corrected or updated based on the local time information taken in from the outside as described above.

The in-vehicle information processing apparatus 10 includes a control circuit 42 mainly configured with a microcomputer. The control circuit 42 includes functions of various information services including a navigation function and communication control. The control circuit 42 is connected with a GPS receiver 44, an input unit 46, a memory 48, a voice switching unit 50, a display unit 52, and a Bluetooth interface (BT) 54.

The GPS receiver 44 is a device to receive a GPS signal transmitted from a GPS satellite 55 via a reception antenna 56. The input unit 46 is constituted with switches, which is a part for vehicle passengers (especially, the driver) to perform an input operation when making or receiving a call. The memory 48 stores an operation program that implements the various functions, and is capable of storing various data.

The voice switching unit 50 is connected with a microphone 58 and a loudspeaker 60. The voice switching unit 50 converts a voice signal input from the outside with the microphone 58 into audio data that can be transmitted to the mobile terminal 14 from the BT 54 by wireless transmission, and converts audio data received at the BT 54 from the mobile terminal 14 into a voice signal that can be output from the loudspeaker 60. The display unit 52 is a display device including an LCD that is visible for a vehicle passenger, on which various displaying can be executed. Also, the BT 54 is a communication device to execute a communication process based on Bluetooth communication standards for executing near field communication, which standards make it possible to establish wireless communication connection with a terminal having a BT (for example, a mobile terminal 14 having the BT 28) existing within a predetermined communication area, using an antenna 62.

Also, the control circuit 42 includes a clock function 64 to clock the time. The control circuit 42 can obtain Coordinated Universal Time UTC (or Greenwich Mean Time GMT) included in a GPS signal from a GPS satellite. Based on the obtained Coordinated Universal Time UTC, the control circuit 42 detects a current position of the vehicle, and calculates local time information at the position. Note that this local time information may be calculated as the local time information in a use region of the vehicle based on the obtained Coordinated Universal Time UTC and the use region registered in advance, or may be calculated as the local time information at the current position of the vehicle based on the obtained Coordinated Universal Time UTC and the obtained current position.

Based on the obtained Coordinated Universal Time UTC, the clock function 64 clocks Coordinated Universal Time UTC, and clocks the local time in a country or a region where the vehicle is located. The local time information obtained by the clock function 64 can be output and displayed on the display unit 52 superposed on a map display screen when displaying a map.

Next, with reference to FIG. 2, operations in the information service system 12 will be described according to the present embodiment. FIG. 2 is a flowchart of an example of a routine executed by the in-vehicle information processing apparatus and the mobile terminal 14 in the information service system 12 in the present embodiment.

In the information service system 12 in the present embodiment, the in-vehicle information processing apparatus 10 as an in-vehicle device can make a near field communication connection (Bluetooth connection) with the mobile terminal 14 that exists in the vehicle, after an electric power source state of the vehicle is transitioned from an off state to an accessory (ACC) on state.

When the electric power source state of the vehicle is transitioned from an off state to an accessory (ACC) on state, the control circuit 42 of the in-vehicle information processing apparatus 10 has the BT 54 transmit a signal requesting a Bluetooth connection (Bluetooth connection request) to the mobile terminal 14, automatically or in response to a predetermined operation. The mobile terminal 14 can receive the signal requesting a Bluetooth connection from the in-vehicle information processing apparatus 10 by the BT 28. In response to receiving the signal indicating the Bluetooth connection request from the in-vehicle information processing apparatus 10, the control circuit 16 of the mobile terminal 14 has the BT 28 transmit a reply signal granting the Bluetooth connection if a reply is permitted to the Bluetooth connection request.

After the in-vehicle information processing apparatus 10 has transmitted the signal indicating the Bluetooth connection request, and then, receives the reply signal granting the Bluetooth connection from the mobile terminal 14, the Bluetooth connection between the in-vehicle information processing apparatus 10 and the mobile terminal 14 is established, and thereafter, the in-vehicle information processing apparatus 10 and the mobile terminal 14 are kept connected with each other by the Bluetooth connection.

When the Bluetooth connection is realized, the control circuit 42 of the in-vehicle information processing apparatus 10, automatically or in response to a predetermined operation, has the BT 54 transmit a signal requesting to transfer information about a telephone directory or outgoing/incoming call history information (referred to as PBAP (Phone Book Access Profile) information below) stored in the memory 22, to the mobile terminal 14 (PBAP request). In response to receiving the signal indicating the PBAP request from the in-vehicle information processing apparatus 10, the control circuit 16 of the mobile terminal 14 has the BT 54 transmit the PBAP information about the telephone directory and the outgoing/incoming call history information stored in the memory 22.

The outgoing/incoming call history information stored in the memory 22 of the mobile terminal 14 is based on local time that represents the time in a country or a region where each outgoing or incoming call has been made. The mobile terminal 14 can display the outgoing/incoming call history information of the phone calls by the local time on the display unit 16. Also, the outgoing/incoming call history information included in the PBAP information transmitted by the mobile terminal 14 on a request from the in-vehicle information processing apparatus 10 may be based on the local time representing time in a country or a region where an outgoing or incoming call is made, or based on time converted to Coordinated Universal Time UTC (or Greenwich Mean Time GMT) from the local time where an outgoing or incoming call is made, as long as the time used in the phone call history information is based on either one of the local time or Coordinated Universal Time UTC for the mobile terminal 14.

After the in-vehicle information processing apparatus 10 has transmitted a signal of a PBAP request, and receives the PBAP information from the mobile terminal 14, the control circuit 42 obtains the outgoing/incoming call history information of phone calls of the mobile terminal 14 based on the PBAP information. Here, suppose that the in-vehicle information processing apparatus 10 assumes that outgoing/incoming call history information obtained from every mobile terminal 14 is always based on the local time, or is always based on Coordinated Universal Time UTC. Then, if the control circuit 42 uses time information included in the obtain outgoing/incoming call history information as it is without correction assuming that it is based on the local time information (for example, display the time on the display unit 52), or inflexibly corrects it assuming that it is based on Coordinated Universal Time UTC (for example, display the time information on the display unit 52 after adding nine hours to show Japan Standard Time), the outgoing/incoming call history information of the mobile terminal 14 provided by the in-vehicle information processing apparatus 10 may not present the correct local time information at a region or a place indicated by the history information.

For example, the outgoing/incoming call history information included in the PBAP information transmitted from the mobile terminal 14 to the in-vehicle information processing apparatus 10 may be based on the local time representing time in Japan where the outgoing or incoming call has been made on the mobile terminal 14. Nevertheless, the in-vehicle information processing apparatus 10 assumes that the outgoing/incoming call history information obtained from the mobile terminal 14 is always based on Coordinated Universal Time UTC, and the control circuit 42 corrects the time information included in the obtained outgoing/incoming call history information by inflexibly adding nine hours. Then, the local time information provided by the in-vehicle information processing apparatus 10 as the outgoing/incoming call history information of the mobile terminal 14 is ahead of the local time information included in the actual outgoing/incoming call history information on the mobile terminal 14 by nine hours. Consequently, a time lag is generated (see the upper side in FIG. 2 that illustrates displayed contents of the display unit of the mobile terminal 14 and the display unit of the in-vehicle information processing apparatus 10).

Thereupon, the information service system 12 including the in-vehicle information processing apparatus 10 in the present embodiment improves accuracy of the time information for the in-vehicle information processing apparatus 10 to provide the history information of a mobile terminal 14.

Namely, in a state where a Bluetooth connection is established between the in-vehicle information processing apparatus 10 and a mobile terminal 14 in the information service system 12 in the present embodiment, when an outgoing call or incoming call is made on the mobile terminal 14 using the in-vehicle information processing apparatus 10, a vehicle passenger can have a conversation with a partner on the other end through the microphone 58 and the loudspeaker 60 included in the in-vehicle information processing apparatus 10, without picking up the Bluetooth-connected mobile terminal 14. When the phone call ends, the memory 22 of the mobile terminal 14 stores the outgoing/incoming call history information of the phone call that includes the local time of a country or a region where the phone call is made.

When the phone call has been made and ended in a state where a Bluetooth connection has been established between the in-vehicle information processing apparatus 10 and the mobile terminal 14, soon after the completion of the phone call, the control circuit 42 of the in-vehicle information processing apparatus 10 has the BT 54 transmit a signal indicating a request for transferring the PBAP information stored in the memory 22 to the mobile terminal 14 (PBAP request). In response to receiving the signal indicating the PBAP request from the in-vehicle information processing apparatus 10, the control circuit 16 of the mobile terminal 14 has the BT 28 transmit the PBAP information about the telephone directory and outgoing/incoming call history information stored in the memory 22.

The outgoing/incoming call history information stored in the memory 22 of the mobile terminal 14 is based on the local time representing time in a country or a region where an outgoing or incoming call has been made. Therefore, the outgoing/incoming call history information soon after the completion of the phone call should include the local time relating to the phone call made in the state where the Bluetooth connection has been established between the in-vehicle information processing apparatus 10 and the mobile terminal 14. Consequently, the PBAP information transmitted from the mobile terminal 14 to the in-vehicle information processing apparatus 10 soon after the completion of the phone call in the state where the Bluetooth connection has been established between the in-vehicle information processing apparatus 10 and the mobile terminal 14 is based on the latest outgoing/incoming call history information.

On the other hand, the outgoing/incoming call history information included in the PBAP information transmitted from the mobile terminal 14 to the in-vehicle information processing apparatus 10 is fixed based on one of the local time and the Coordinated Universal Time UTC depending on the mobile terminal 14 as described above. The control circuit 42 of the in-vehicle information processing apparatus 10 executes the following process to determine which one of the local time and the Coordinated Universal Time UTC is used in the outgoing/incoming call history information included in the PBAP information received by the in-vehicle information processing apparatus 10 from the mobile terminal 14 that has transmitted from the mobile terminal 14 to the in-vehicle information processing apparatus 10.

Namely, when a phone call is made in the state where the Bluetooth connection has been established between the in-vehicle information processing apparatus 10 and the mobile terminal 14, the control circuit 42 calculates the local time information at the vehicle position when the phone call is made, using the clock function 64, namely, using Coordinated Universal Time UTC included in a GPS signal from the GPS satellite 55. Also, the control circuit 42 obtains the PBAP information based on the latest outgoing/incoming call history information from the mobile terminal 14 after the completion of the phone call in the state where the Bluetooth connection has been established between the in-vehicle information processing apparatus 10 and the mobile terminal 14. Then, the control circuit 42 compares the local time calculated as above when the phone call is made, and the time in the latest outgoing/incoming call history information obtained from the mobile terminal 14 as described above (especially, the time of the final phone call history information) (Step 100).

No difference is generated between these compared two times when the outgoing/incoming call history information included in the PBAP information transmitted from the mobile terminal 14 to the in-vehicle information processing apparatus 10 is based on the local time. On the other hand, a difference is generated when the outgoing/incoming call history information included in the PBAP information transmitted from the mobile terminal 14 to the in-vehicle information processing apparatus 10 is based on Coordinated Universal Time UTC.

For example, if a phone call is made at a local time (Japan Standard Time) of 20:30 on April 21 in a state where a Bluetooth connection has been established between the in-vehicle information processing apparatus 10 and a mobile terminal 14 in Japan, and the outgoing/incoming call history information included in the PBAP information transmitted from the mobile terminal 14 to the in-vehicle information processing apparatus 10 is based on the local time in Japan, then the time of the outgoing/incoming call history information received by the in-vehicle information processing apparatus 10 from the mobile terminal is the local time of 20:30 on April 21. On the other hand, if the outgoing/incoming call history information included in the PBAP information transmitted from the mobile terminal 14 to the in-vehicle information processing apparatus 10 is based on Coordinated Universal Time UTC, then the time of the outgoing/incoming call history information received by the in-vehicle information processing apparatus 10 from the mobile terminal is 11:30 on April 21 represented by Coordinated Universal Time UTC, which is nine hours behind the local time.

As a result of the above time comparison, if a difference between the two times is not greater than a predetermined value or greater, the control circuit 42 of the in-vehicle information processing apparatus 10 determines that the outgoing/incoming call history information included in the PBAP information transmitted from the mobile terminal 14 to the in-vehicle information processing apparatus 10 and received by the in-vehicle information processing apparatus 10 from the mobile terminal 14 is based on the local time. The above "difference greater than a predetermined value or greater" means that the times are apart beyond a range where the times can be determined as substantially the same, which is set to, for example, one minute or five minutes.

If determining as above for the mobile terminal 14, then thereafter, the control circuit 42 uses the time information included in the outgoing/incoming call history information included in the PBAP information received from the mobile terminal 14 as it is without correction, for example, has the display unit 52 display the time information included in the outgoing/incoming call history information from the mobile terminal 14. In this case, the outgoing/incoming call history information of the phone call done by the mobile terminal 14 is displayed by the local time on the display unit 52 of the in-vehicle information processing apparatus 10.

On the other hand, if the difference between the two times is greater than the predetermined value or greater, the control circuit 42 determines that the outgoing/incoming call history information included in the PBAP information transmitted from the mobile terminal 14 to the in-vehicle information processing apparatus 10 and received by the in-vehicle information processing apparatus 10 from the mobile terminal 14 is based on Coordinated Universal Time UTC.

If determining as above for the mobile terminal 14, then thereafter, the control circuit 42 uses the time information included in the outgoing/incoming call history information included in the PBAP information received from the mobile terminal 14 in correcting the time information by the time lag between the local time and the Coordinated Universal Time UTC, and has the display unit 52 display the time information, for example, in Japan, having nine hours added (Step 110). In this case, the outgoing/incoming call history information of the phone call done by the mobile terminal 14 is displayed by the local time on the display unit 52 of the in-vehicle information processing apparatus 10.

As described above, in the information service system 12 in the present embodiment, when a phone call is made in a state where a Bluetooth connection has been established between the in-vehicle information processing apparatus 10 and the mobile terminal 14, by comparing the time in the latest outgoing/incoming call history information transmitted from the mobile terminal 14 to the in-vehicle information processing apparatus 10 and obtained by the in-vehicle information processing apparatus 10 from the mobile terminal 14, with the local time calculated by the in-vehicle information processing apparatus 10 for the phone call when detecting the position based on Coordinated Universal Time UTC included in a GPS signal, for the time in the latest outgoing/incoming call history information transmitted from the mobile terminal 14 to the in-vehicle information processing apparatus 10 and obtained by the in-vehicle information processing apparatus 10 from the mobile terminal 14, it can be determined whether it is based on the local time or the Coordinated Universal Time UTC.

Then, if the time in the latest outgoing/incoming call history information from the mobile terminal 14 is based on the local time, the time can be used as the local time as it is without correction. On the other hand, if the time in the latest outgoing/incoming call history information from the mobile terminal 14 is based on Coordinated Universal Time UTC, the time can be used by correcting it to the local time.

Therefore, according to the system in the present embodiment, even if the in-vehicle information processing apparatus 10 does not recognize in advance whether the outgoing/incoming call history information transmitted from a mobile terminal 14 to the in-vehicle information processing apparatus 10 via a Bluetooth connection is based on the local time or Coordinated Universal Time UTC, the in-vehicle information processing apparatus 10 can always provide the time representing by the local time for a vehicle passenger. Therefore, according to the present embodiment, accuracy of the time information can be improved when the outgoing/incoming call history information of a phone call on a mobile terminal 14 is handled by the in-vehicle information processing apparatus 10 to provide the time for a vehicle passenger.

Also, in the present embodiment system, when a mobile terminal 14 that has been Bluetooth-connected with the in-vehicle information processing apparatus 10 is changed to another mobile terminal 14, appropriate time correction can be executed for the changed mobile terminal 14, to provide the outgoing/incoming call history information obtained by the in-vehicle information processing apparatus 10 from the mobile terminal 14 for a vehicle passenger. Therefore, according to the present embodiment, for each mobile terminal 14 that may be Bluetooth-connected with the in-vehicle information processing apparatus 10, time information of the outgoing/incoming call history information of a phone call made by the mobile terminal 14 can be accurately handled by the in-vehicle information processing apparatus 10 to provide the time to a vehicle passenger.

Note that Coordinated Universal Time UTC included in a GPS signal from the GPS satellite 55 whose information is obtained by the in-vehicle information processing apparatus 10 in the above embodiment corresponds to "reference time" described in the claims;

The time in the outgoing/incoming call history information included in the PBAP information transferred from the mobile terminal 14 to the in-vehicle information processing apparatus 10 after a phone call ends between the in-vehicle information processing apparatus 10 and the Bluetooth-connected mobile terminal 14 (especially, the time of the final phone call history information) corresponds to a "first time" described in the claims;

The local time at the vehicle position calculated by the in-vehicle information processing apparatus 10 using Coordinated Universal Time UTC included in a GPS signal from the GPS satellite 55 when a phone call is made by the Bluetooth-connected mobile terminal 14 corresponds to a "second time" described in the claims; and The BT 28 or 54 corresponds to a "communication unit" described in the claims.

Also, a "first information obtainment unit" described in the claims is realized by the control circuit 42 of the in-vehicle information processing apparatus 10 by receiving and obtaining the PBAP information transmitted by the mobile terminal 14 in response to a the transfer request of the PBAP information including the outgoing/incoming call history information of the Bluetooth-connected mobile terminal 14;

A "second information obtainment unit" described in the claims is realized by obtaining Coordinated Universal Time UTC included in a GPS signal from the GPS satellite 55;

A "calculation unit" described in the claims is realized by calculating a difference between the time in the outgoing/incoming call history information included in the PBAP information transferred from the mobile terminal 14 after a phone call ends with the Bluetooth-connected mobile terminal 14, and the local time at the vehicle position calculated by the in-vehicle information processing apparatus 10 using Coordinated Universal Time UTC included in a GPS signal from the GPS satellite 55 when a phone call is made by the Bluetooth-connected mobile terminal 14; and A "correction unit" described in the claims is realized by correcting the time in the outgoing/incoming call history information included in the PBAP information transferred from the mobile terminal 14 to handle on the vehicle by a time lag between the local time and the Coordinated Universal Time UTC if the calculated difference is greater than the predetermined value or greater.

Incidentally, although the above embodiment is described for correction of time of the outgoing/incoming call history information of a phone call made by the mobile terminal 14 to handle the time in the in-vehicle information processing apparatus 10, the present invention is not limited to that, but the present invention can be used for correction of time of the outgoing/incoming call history information of an e-mail made by the mobile terminal 14 to handle the time in the in-vehicle information processing apparatus 1.

Also, in the above embodiment, the control circuit 42 of the in-vehicle information processing apparatus 10 calculates a difference between the time in the outgoing/incoming call history information included in the PBAP information transferred from the mobile terminal 14 after a phone call ends with the Bluetooth-connected mobile terminal 14, and the local time at the vehicle position calculated by the in-vehicle information processing apparatus 10 using Coordinated Universal Time UTC included in a GPS signal from the GPS satellite 55 when a phone call is made by the Bluetooth-connected mobile terminal 14. Then, if the calculated difference is greater than the predetermined value or greater, the control circuit corrects the time in the outgoing/incoming call history information included in the PBAP information transferred from the mobile terminal 14 to handle on the vehicle, by a time lag between the local time and the Coordinated Universal Time UTC. However, the present invention is not limited to that, but the control circuit 42 calculates a difference between the time in the outgoing/incoming call history information included in the PBAP information transferred from the mobile terminal 14 after a phone call ends with the Bluetooth-connected mobile terminal 14, and Coordinated Universal Time UTC calculated by the in-vehicle information processing apparatus 10 using a GPS signal from the GPS satellite 55 when a phone call is made by the Bluetooth-connected mobile terminal 14. Then, if the calculated difference is greater than the predetermined value or greater, the control circuit 42 corrects the time in the outgoing/incoming call history information included in the PBAP information transferred from the mobile terminal 14 to handle on the vehicle by a time lag between the local time and the Coordinated Universal Time UTC.

Also, in the above embodiment, Coordinated Universal Time UTC included in a GPS signal from the GPS satellite 55 whose information is obtained by the in-vehicle information processing apparatus 10 is used as "reference time" required for determining whether to execute a correction of the time in the outgoing/incoming call history information included in the PBAP information obtained from the mobile terminal 14. However, the present invention is not limited to that, but time information obtained by the in-vehicle information processing apparatus 10 transmitted from an external information center that provides information services to the in-vehicle information processing apparatus 10 may be used as the "reference time".

Furthermore, in the above embodiment, the information service system 12 is used with which the in-vehicle information processing apparatus 10 and the mobile terminal 14 establish a Bluetooth connection for near field communication. However, the present invention is not limited to that, but an information service system may be used with which the in-vehicle information processing apparatus 10 and the mobile terminal 14 are connected by wired connection.

DESCRIPTION OF REFERENCE SYMBOLS

10 in-vehicle information processing apparatus
12 information service system
14 mobile terminal
16, 42 control circuit
18 communication circuit
28, 54 BT
32 wireless communication network
40, 64 clock function
44 GPS receiver
55 GPS satellite

The invention claimed is:

1. An in-vehicle information processing apparatus comprising:
a first information obtainment unit configured to obtain history information including time information on a mobile terminal from the mobile terminal being connected with a vehicle for communication, the vehicle having the in-vehicle information processing apparatus installed;
a second information obtainment unit configured to obtain reference time information;
a calculation unit configured to calculate a time lag, in a state where the vehicle and the mobile terminal are connected with each other for communication, after the mobile terminal has established wireless communication with an external counterpart, between a first time included in the history information whose information is obtained by the first information obtainment unit obtained when the wireless communication is executed, and a second time when the wireless communication is executed with reference to a reference time whose information is obtained by the second information obtainment unit; and
a correction unit configured to correct the history information whose information is obtained by the first information obtainment unit based on the time lag between the first time and the second time calculated by the calculation unit, when handling the time information on the vehicle.

2. The in-vehicle information processing apparatus as claimed in claim 1, wherein the history information is information including time information about transmitting and receiving a phone call or an e-mail made by the mobile terminal with the external counterpart via a wireless communication connection.

3. The in-vehicle information processing apparatus as claimed in claim 1, wherein the vehicle and the mobile terminal are connected with each other for communication using a communication unit for near field communication.

4. The in-vehicle information processing apparatus as claimed in claim 1, wherein the first information obtainment unit obtains the history information by receiving the history information transmitted by the mobile terminal in response to a transfer request for the history information to the mobile terminal being connected with the vehicle for the communication.

5. The in-vehicle information processing apparatus as claimed in claim 1, wherein the second information obtainment unit obtains time information included in a GPS signal being transmitted from a GPS satellite as the reference time information.

6. The in-vehicle information processing apparatus as claimed in claim 1, wherein the correction unit corrects the history information obtained by the first information obtainment unit by an amount of the time lag to handle time information on the vehicle, based on the time lag between the first time and the second time calculated by the calculation unit.

7. The in-vehicle information processing apparatus as claimed in claim 1, wherein the correction unit corrects the history information whose information is obtained by the first information obtainment unit when providing time information to a passenger of the vehicle, based on the time lag between the first time and the second time calculated by the calculation unit.

8. An in-vehicle information processing method comprising:
obtaining history information including time information on a mobile terminal from the mobile terminal being connected with a vehicle for communication, the vehicle having the in-vehicle information processing apparatus installed;
obtaining reference time information;
calculating a time lag, in a state where the vehicle and the mobile terminal are connected with each other for communication, after the mobile terminal has established wireless communication with an external counterpart, between a first time included in the history information whose information is obtained by the obtaining the history information obtained when the wireless communication is executed, and a second time when the wireless communication is executed with reference to a reference time whose information is obtained by the obtaining the reference time information; and
correcting the history information whose information is obtained by the obtaining the history information based on the time lag between the first time and the second time calculated by the calculating, when handling the time information on the vehicle.

* * * * *